(12) United States Patent
Spence

(10) Patent No.: US 12,189,567 B2
(45) Date of Patent: Jan. 7, 2025

(54) METHODS AND SYSTEMS FOR LIGHTWEIGHT MULTIPROTOCOL GATEWAY AND BRIDGE

(71) Applicant: NXP USA, Inc., Austin, TX (US)

(72) Inventor: Nicholas Justin Mountford Spence, Phoenix, AZ (US)

(73) Assignee: NXP USA, Inc., Austin, TX (US)

( * ) Notice: Subject to any disclaimer, the term of this patent is extended or adjusted under 35 U.S.C. 154(b) by 349 days.

(21) Appl. No.: 17/682,447

(22) Filed: Feb. 28, 2022

(65) Prior Publication Data

US 2023/0273894 A1 Aug. 31, 2023

(51) Int. Cl.
*G06F 13/42* (2006.01)
*G06F 13/364* (2006.01)
*G06F 13/40* (2006.01)

(52) U.S. Cl.
CPC ........ *G06F 13/4282* (2013.01); *G06F 13/364* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 5,878,234 A | 3/1999 | Dutkiewicz et al. | |
| 7,761,633 B2 | 7/2010 | Devila et al. | |
| 9,411,770 B2 | 8/2016 | Decesaris et al. | |
| 9,606,947 B2 | 3/2017 | Ross et al. | |
| 10,268,614 B2 | 4/2019 | Shahramian et al. | |
| 11,016,543 B2* | 5/2021 | Filser | H02J 7/0045 |
| 2017/0374490 A1* | 12/2017 | Schoppmeier | H04L 67/12 |

FOREIGN PATENT DOCUMENTS

| | | |
|---|---|---|
| CN | 202167015 U | 3/2012 |
| CN | 105335322 B | 7/2018 |

OTHER PUBLICATIONS

Shwetha, S. et al., "The Design of Multiprotocol Interface Device", IEEE Xplore; 3 pages (2016).

* cited by examiner

*Primary Examiner* — Farley Abad
*Assistant Examiner* — Dayton Lewis-Taylor

(57) ABSTRACT

Digitally controllable elements capable of influencing operation of a power amplifier module are coupled to an interface gateway device using a first serial data interface that communicates using a first serial protocol. The interface gateway device receives serial data on multiple external serial data interfaces that utilize various serial protocols, and converts the various serial protocols to the first serial protocol. Each digitally controllable element includes address control logic that decodes an address presented on the first serial data interface as well as a device specific ID. In response to the decoding, physical registers in different digitally controllable elements are written.

20 Claims, 13 Drawing Sheets

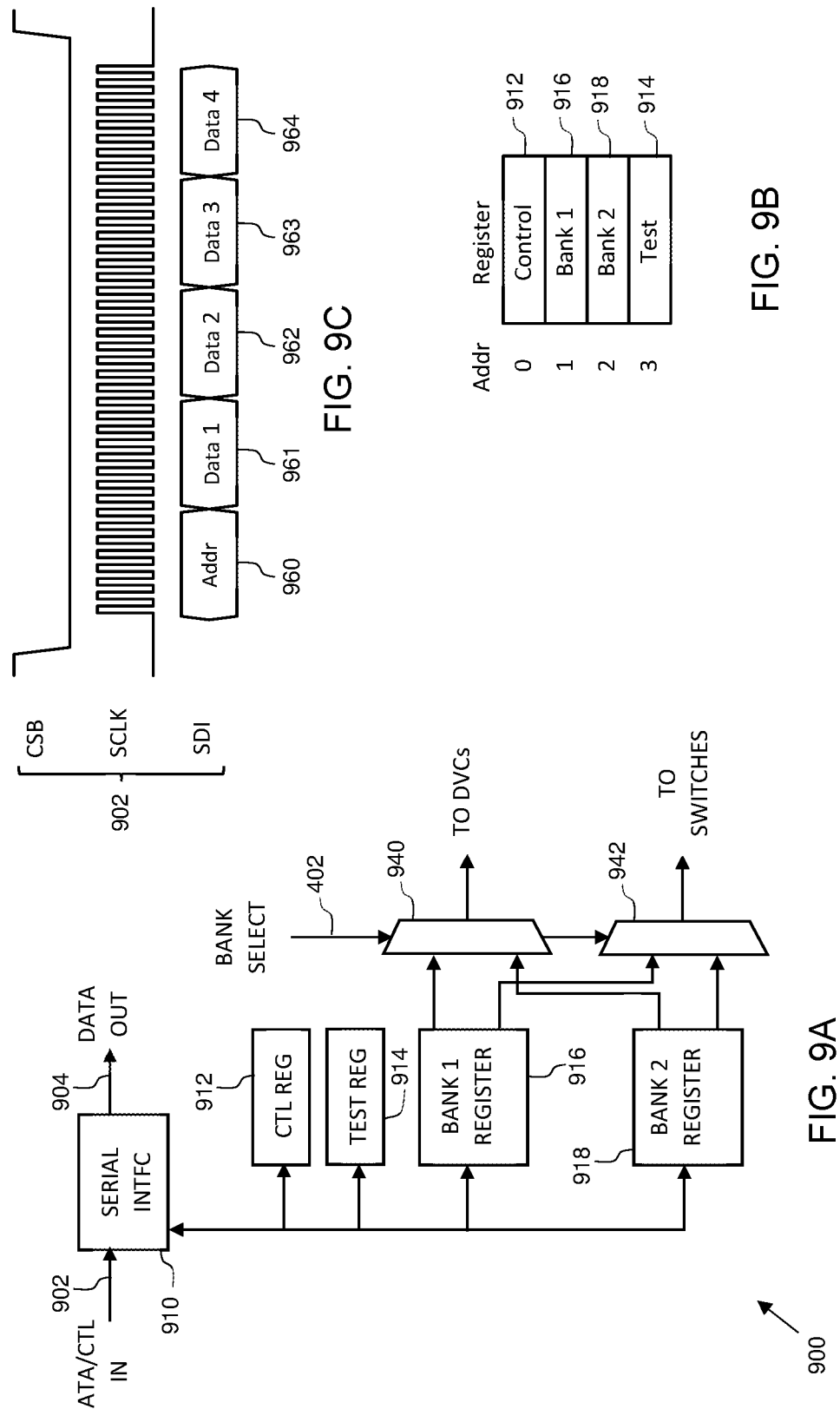

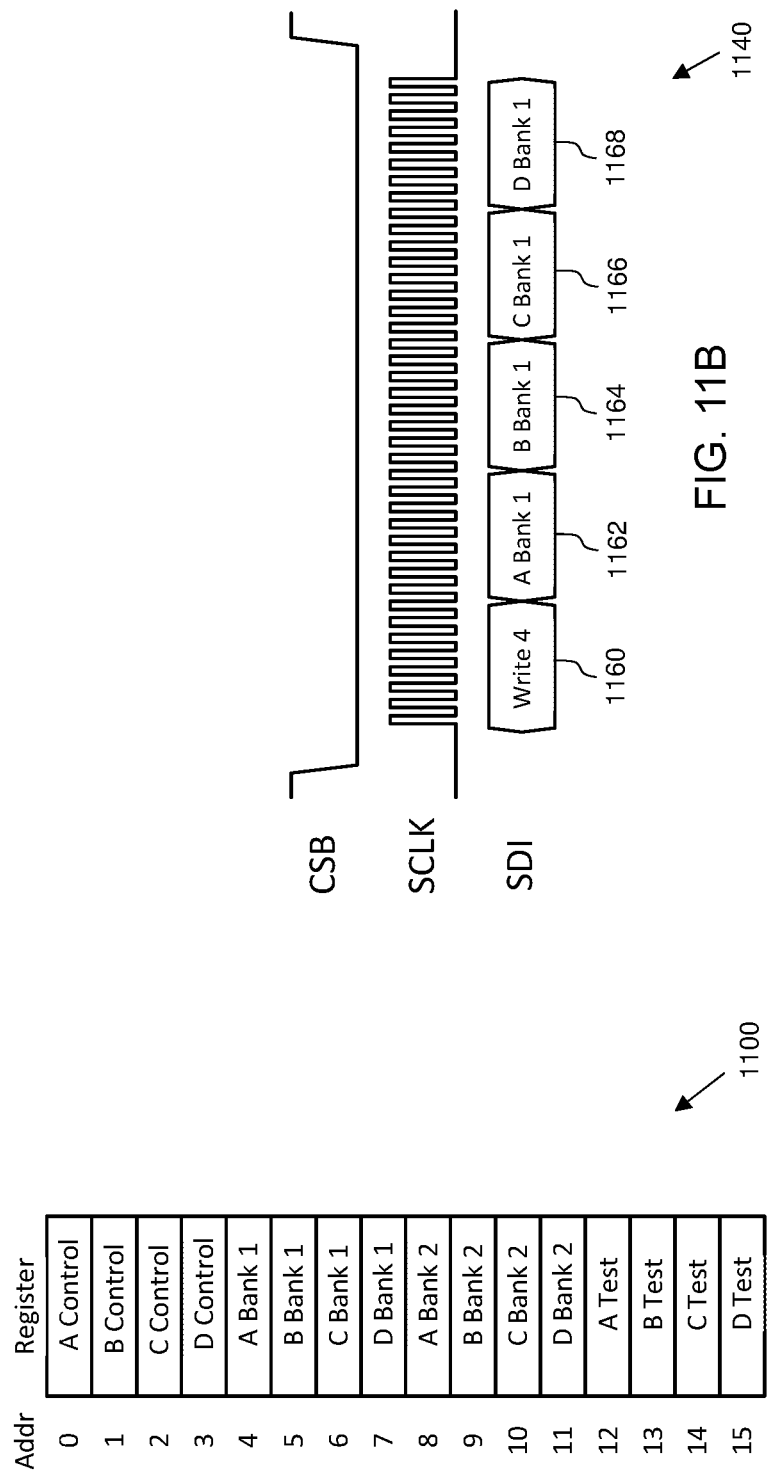

METHODS AND SYSTEMS FOR LIGHTWEIGHT MULTIPROTOCOL GATEWAY AND BRIDGE

TECHNICAL FIELD

Embodiments of the subject matter described herein relate generally to serial data communications, and more particularly to interconnecting devices using different serial protocols.

BACKGROUND

Many radio frequency (RF) circuits provide for digital control of circuit elements by supporting digital communications over serial data interfaces. For example, an RF module that includes one or more RF circuits may be included in a larger system that communicates with the RF module over serial data interfaces. The type, or communications "protocol" supported by serial data interfaces employed by systems that include RF modules may vary, and RF modules may support many different serial protocols to allow their use in different systems.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 9A shows a block diagram of a digitally controllable element, in accordance with an example embodiment;

FIG. 9B shows an address map of the digitally controllable element of FIG. 9A, in accordance with an example embodiment;

FIG. 9C shows a timing diagram of a write operation to the digitally controllable element of FIG. 9A, in accordance with an example embodiment;

FIG. 11A shows an address map of the multiple interconnected digitally controllable elements of FIG. 10A, in accordance with an example embodiment;

FIG. 11B shows a timing diagram of a write operation to the multiple interconnected digitally controllable elements of FIG. 10A, in accordance with an example embodiment;

DETAILED DESCRIPTION

Figure 1:
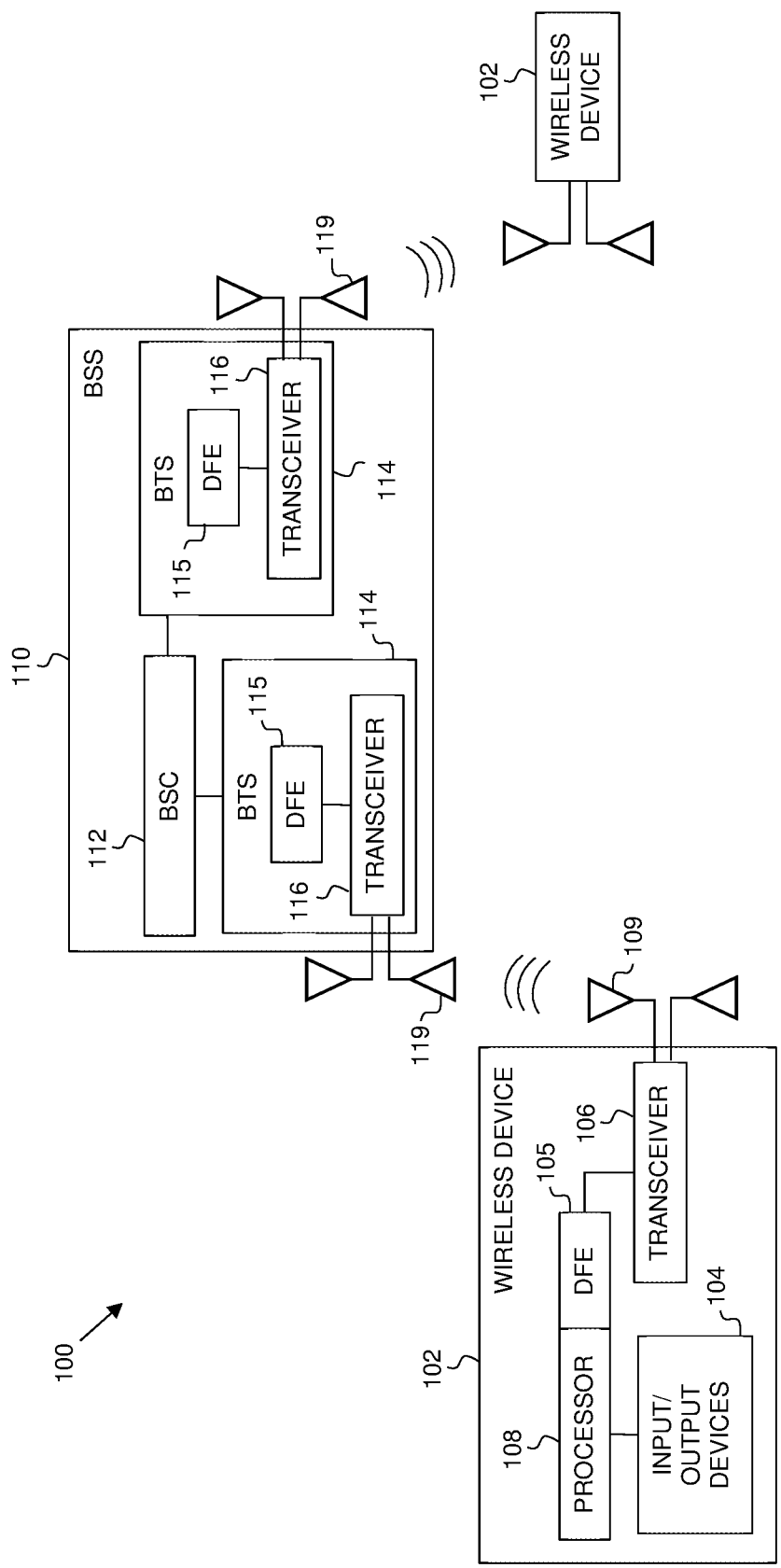
FIG. 1 is a simplified block diagram of a wireless communication system, in accordance with an example embodiment.

FIG. 1 is a simplified block diagram of a wireless communication system 100 that includes one or more base station systems (BSS) 110, and one or more wireless devices 102. Wireless devices 102 may include, for example, subscriber stations (e.g., hand-held computers, Internet of Things (IoT) devices, cellular telephones, etc.) that wirelessly communicate with the one or more BSS 110. BSS 110 may include any radio access network (RAN) node such as, for example, an evolved Node-B or eNB devices of an LTE (Long Term Evolution) network) or any other type of RAN node in any other type of communication network.

As shown in FIG. 1, each wireless device 102 includes a radio frequency (RF) transceiver 106, a digital front end (DFE) 105, a baseband processor 108, input/output (I/O) devices 104, and antenna(s) 109. In operation, DFE 105 communicates data to a radio frequency (RF) transmitter within RF transceiver 106. Baseband processor 108 (e.g., a digital signal processor) is connected through DFE 105 to the RF transceiver 106, which in turn is connected to the one or more antennas 109. The baseband processor 108 and the DFE 105 may be implemented as one or more integrated circuits to provide the digital processing functionality of the wireless device 102. The digital processing components consolidated on the DFE 105 may include one or more control processors and digital transmit/receive filters, as well as interface peripherals and other I/O for RF subsystem functions. In various embodiments, each RF transceiver 106 (including an RF transmitter and an RF receiver) is configured to receive or transmit voice, data, or both voice and data using the antenna(s) 109, and to provide an interface for signals between the antennas 109 and the DFE 105. More specifically, each RF transceiver 106 is configured to perform digital-to-analog conversion and amplification of signals from the DFE 105, and to amplify and perform analog-to-digital conversion of signals received over the air interface by an antenna 109. In addition, each wireless device 102 may include one or more input/output devices 104 (e.g., a camera, a keypad, display, etc.), along with other components (not shown).

The BSS 110 includes a base station controller (BSC) 112 and one or more base transceiver stations (BTS) 114, where each BTS 114 provides a communication interface between the BSC 112 and antennas 119. The BSC 112 may, for example, be configured to schedule communications for the wireless devices 102. Through antennas 109, 119, each wireless device 102 communicates with the BSC 112 of the BSS 110 via one of the BTS 114.

Essentially, each BTS 114 is configured to receive or transmit signals that include processed voice, data, or both voice and data through the antenna(s) 119, and to provide an interface for signals between the antennas 119 and the BSC 112. The BTS(s) 114 each include a DFE 115 which may be implemented as one or more integrated circuits to provide the digital processing functionality of the BTS 114. The digital processing components consolidated on the DFE 115 may include one or more control processors and digital transmit/receive filters, as well as interface peripherals and other I/O for RF subsystem functions. In addition, the BTS(s) 114 each include an RF transceiver 116 (including an RF transmitter and an RF receiver), which is configured to perform digital-to-analog conversion and amplification of signals from the DFE 115, and to amplify and perform analog-to-digital conversion of signals received over the air interface by an antenna 119.

In various embodiments, transceiver 116 includes one or more power amplifier modules to amplify signals and transmit resulting RF signals using antenna 119. In some embodiments, the power amplifier modules include digital control interfaces to allow control of digitally controllable elements that influence or modify the operation of the amplifier. For example, digitally controllable elements may modify a capacitance value of a digitally variable capacitor (DVC) or may control switches that control the presence of circuit elements such as capacitors, inductors and/or resistors in the amplifier circuit. Also for example, a digitally controllable element may modify the operation of circuit elements that bias amplifiers. In general digitally controllable elements may influence or modify the operation of one or more modules within transceiver 116 in any manner.

Digitally controllable elements may be accessed via one or more interface gateway devices that are coupled to digital control interfaces external to the power amplifier module, (allowing host access) and coupled to one or more groups of digitally controllable elements using a control interface internal to the power amplifier module. For example, in some embodiments, an amplifier module may include an interface gateway device that is coupled to multiple external serial data interfaces that utilize different serial protocols, and that is also coupled in parallel to one or more groups of digitally controllable elements using an internal serial data interface. Registers within the digitally controllable elements may be written to, and read from, by a host controller using any of the external serial data interfaces.

In various embodiments, data presented sequentially on any of the external serial data interfaces may be written to registers in different digitally controllable elements in an interleaved sequence in accordance with an interleaved address map. Registers across multiple digitally accessible elements may be logically organized into "banks" such that one bank of registers (including registers in multiple elements) may be written to using sequential data on the external serial data interface before a second bank of registers (also including registers in the multiple elements) may be written to using sequential data on the same external serial data interface. These and other embodiments are described further below.

As will be appreciated, the digital control of amplifier modules disclosed herein with reference to the base station system 110 may also be used in connection with a wireless communication device, such as the wireless devices 102. To this end, and as mentioned earlier, the transceiver 106 of each wireless device 102 may also include multiple digitally controllable elements that present an interleaved register address map to an external serial control interface through an interface gateway device.

Figure 2:
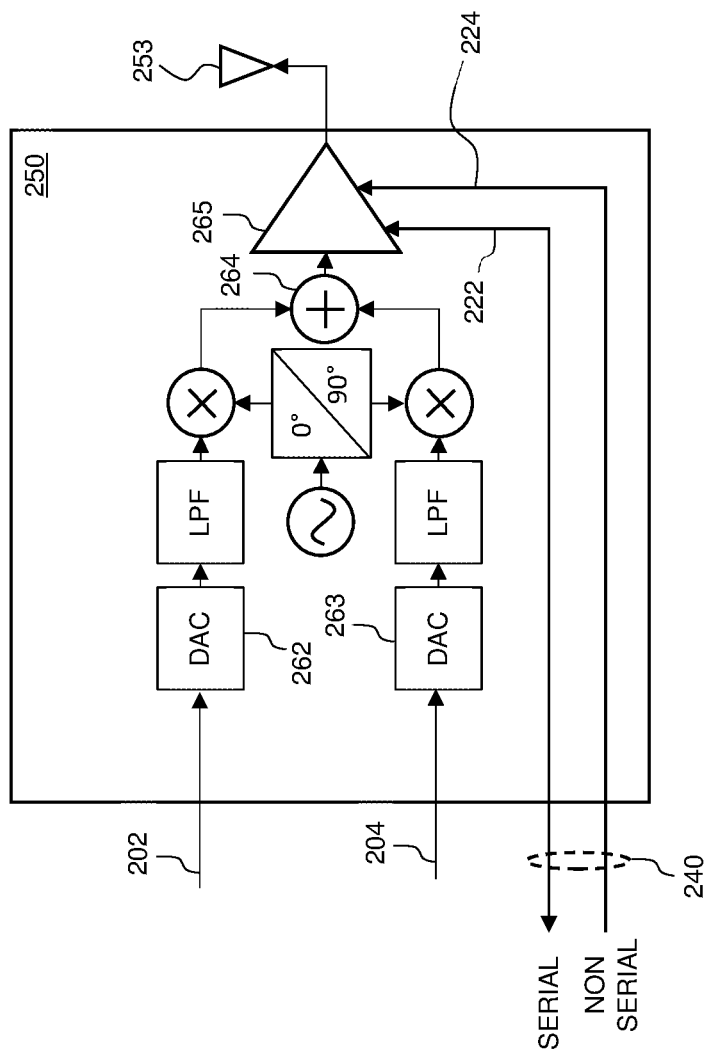
FIG. 2 show a block diagram of an RF transmit front end, in accordance with an example embodiment.

FIG. 2 shows a block diagram of an RF transmit front end, in accordance with an example embodiment. RF transmit front end 250 may be included as a portion of an RF transceiver such as RF transceiver 106 within wireless device 102 or RF transceiver 116 within BSS 110. According to an embodiment, RF transmit front end 250 includes digital-to-analog converters (DACs) 262, 263, low pass filters (LPFs), an oscillator, mixers, a signal combiner 264, and a power amplifier module 265.

Each DAC 262, 263 includes a circuit for converting a digital sampled data stream to an analog signal. Because the analog signals are converted from a complex data stream, each DAC 262, 263 may be defined as a subblock accepting either the real (I) or the imaginary (Q) component of the data stream. For example, DAC 262 may receive digital samples from a digital front end on node 202, and DAC 263 may receive digital samples from a digital front end on node 204. Each DAC 262, 263 performs a digital-to-analog conversion on each received sample, and the resulting analog samples are filtered (e.g., by an LPF). The oscillator produces an RF sinusoidal signal that is used to upconvert (to RF) the analog I and Q sample streams. The filtered, analog I sample stream is mixed with the RF signal, and the filtered, analog Q sample stream is mixed with a 90 degree delayed version of the RF signal in order to re-align the I and Q sample streams. Combiner 264 then combines the two sample streams and provides a single RF input signal to the power amplifier module 265. Power amplifier module 265 amplifies the RF input signal and produces an amplified RF output signal to be transmitted by antenna 253.

As mentioned above, the power amplifier module 265 may include one or more digitally controllable elements (e.g., 411, 421, 431, 441 FIG. 5), the operation of which is controlled using a digital interface such as digital control interface 240. In the example of FIG. 2, digital control interface 240 includes serial data interface 222 or non-serial data interface 224.

In some embodiments, serial data interface 222 may include multiple different serial data interfaces that use different serial protocols. For example, serial data interface 222 may include, in any number and in any combination, a serial peripheral (SPI) interface, an inter-integrated circuit (I2C) interface, an I3C interface, an RF front end (RFFE) interface, or any other serial data interface. As further described below, power amplifier module 265 may include an interface gateway device that is coupled to the external serial data interfaces (e.g., serial data interface 222) and that may provide an internal serial data interface to communicate with one or more groups of digitally controllable elements within power amplifier module 265.

In some embodiments, a first bank of registers that spans multiple digitally controllable elements may be written to using data presented sequentially on serial data interface 222, and then a second bank of registers that also spans multiple digitally controllable elements may be written to using additional data presented sequentially on serial data interface 222. Further, in some embodiments, non-serial data interface 224 may then be used to select a bank of registers to influence or modify the operation of the amplifier module 265. These and other embodiments are further described below.

Figure 3:
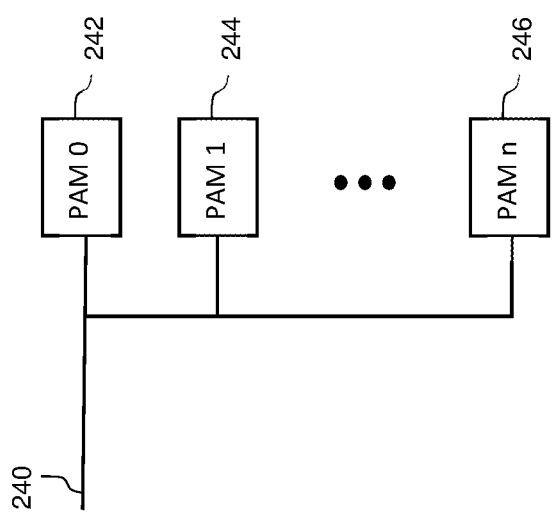
FIG. 3 shows multiple power amplifier modules, in accordance with an example embodiment.

FIG. 3 shows multiple power amplifier modules, in accordance with an example embodiment. Whereas in FIG. 2, digital control interface 240 is shown coupled to a single power amplifier module (PAM), in some embodiments, digital control interface 240 is coupled to multiple PAMs. For example, as shown in FIG. 3, digital control interface 240 may be coupled to "n" power amplifier modules (n>1), represented as PAM 0 242, PAM 1 244, and PAM n 246.

In some embodiments, first control values and first address values on the digital control interface 240 determine which PAM is being communicated with, and second control values and second address values on digital control interface 240 determine which digitally controllable elements or groups of digitally controllable elements within a PAM are being communicated with. These and other embodiments are further described below.

Figure 4:
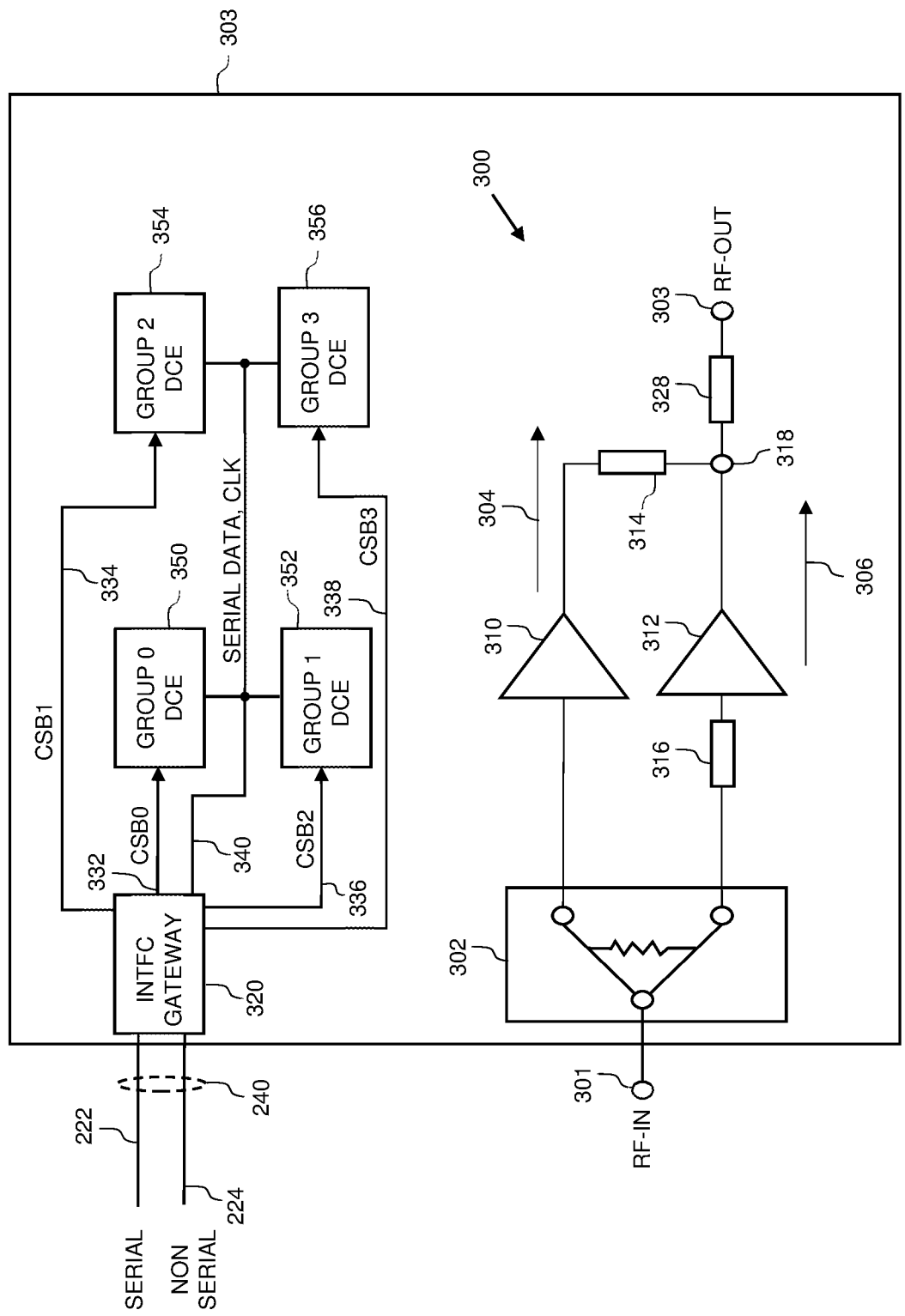
FIGS. 4 and 5 show block diagrams of power amplifier modules including Doherty power amplifiers with groups of digitally controllable elements, in accordance with an example embodiment.

FIG. 4 shows a block diagram of a power amplifier module 303 including a Doherty power amplifier with groups of digitally controllable elements, in accordance with an example embodiment. As shown in FIG. 4, Doherty amplifier 300 (e.g., amplifier module 265, FIG. 2) includes an RF input terminal 301, a power splitter 302, a carrier amplifier path 304, a peaking amplifier path 306, a summing node 318, and an RF output terminal 303. The power splitter 302 is coupled both to the carrier amplifier path 304 and to the peaking amplifier path 306, and is configured to divide an input signal (RF-IN) received at RF input terminal 301 into a carrier RF signal and a peaking RF signal. More specifically, the outputs of power splitter 302 are connected to carrier amplifier 310 (also referred to as a main amplifier) and to peaking amplifier 312. Impedance matching networks or circuits (not illustrated) may be included along the signal transmission paths between the outputs of power splitter 302 and the inputs to the carrier and peaking amplifiers 310, 312. To ensure proper Doherty operation, the carrier amplifier 310 along the carrier amplifier path 304 is biased to operate in Class-AB, and the peaking amplifier 312 along the peaking amplifier path 306 is biased to operate in Class-C.

In the illustrated embodiment, Doherty amplifier 300 has a "non-inverted" Doherty configuration, in which an impedance inverter and/or a λ/4 (90 degree) phase shift element 314 is connected between the output of carrier amplifier 310 and the summing node 318. The output of peaking amplifier 312 also is connected to the summing node 318. The phase shift introduced by element 314 is, in some implementations, compensated by a 90 degree relative phase shift present on path 306 introduced by phase shift element 316, which is present between the power splitter 302 and the input to the peaking amplifier 312. In an alternate embodiment, amplifier 300 may have an "inverted" Doherty configuration. In such a configuration, the impedance inverter and/or λ/4 line phase shift element 314 instead is connected between the output of peaking amplifier 312 and the summing node 318, rather than being connected between the output of carrier amplifier 310 and the summing node 318. In addition, in an inverted Doherty implementation, the phase shift introduced by element 314 between the output of the peaking amplifier 312 and the summing node 318 can be compensated by a 90 degree relative phase shift present on path 304 (e.g., between power splitter 302 and the input to the carrier amplifier 310), rather than on path 306. An impedance transformation network 328 between summing node 318 and the amplifier output 303 functions to present the proper load impedances to each of carrier amplifier 310 and peaking amplifier 312, and outputs the combined signal produced at summing node 318 to the output terminal 303 as an output signal (RF-OUT). The output signal, RF-OUT, in turn, may be provided to an antenna (e.g., antenna 253, FIG. 2), for radiation over the air interface.

Power amplifier module 303 also includes interface gateway device 320 coupled to digital control interface 240, and also coupled to groups of digitally controllable elements (DCE). For example, interface gateway device 320 is coupled to group 0 350, group 1 352, group 2 354, and group 3 356. The various groups 350, 352, 354, 356 are coupled to interface gateway device 320 using an internal serial data interface that includes serial data and clock signals 340 that are common to all groups, and chip select signals CSB 0 332, CSB 1 334, CSB 2 336, CSB 3 338 that are not common to all groups. For example, CSB 0 is coupled to group 0, CSB 1 is coupled to group 1, CSB 2 is coupled to group 2, and CSB 3 is coupled to group 3. Individual groups may include any number of digitally controllable elements.

In various embodiments, interface gateway device 320 converts serial communications from the external serial protocols (e.g., SPI, I2C, I3C, RFFE, etc.) to a single internal protocol as shown in FIG. 4. Converting all of the external protocols in interface gateway device 320 obviates any need for digitally controllable elements to support a complicated multi-protocol interface.

In the embodiment of FIG. 4, one or more digitally controllable elements within groups 0, 1, 2, 3, may be coupled to control circuit elements within Doherty amplifier 300. For example, digitally controllable elements within group 0 350 may influence or modify the operation of impedance matching circuits by controlling switches and variable capacitors, and digitally controllable elements within group 1 352 may influence operation of biasing circuits, etc. A more detailed example of digitally controllable elements in a Doherty power amplifier is discussed below with reference to FIG. 5.

Figure 5:
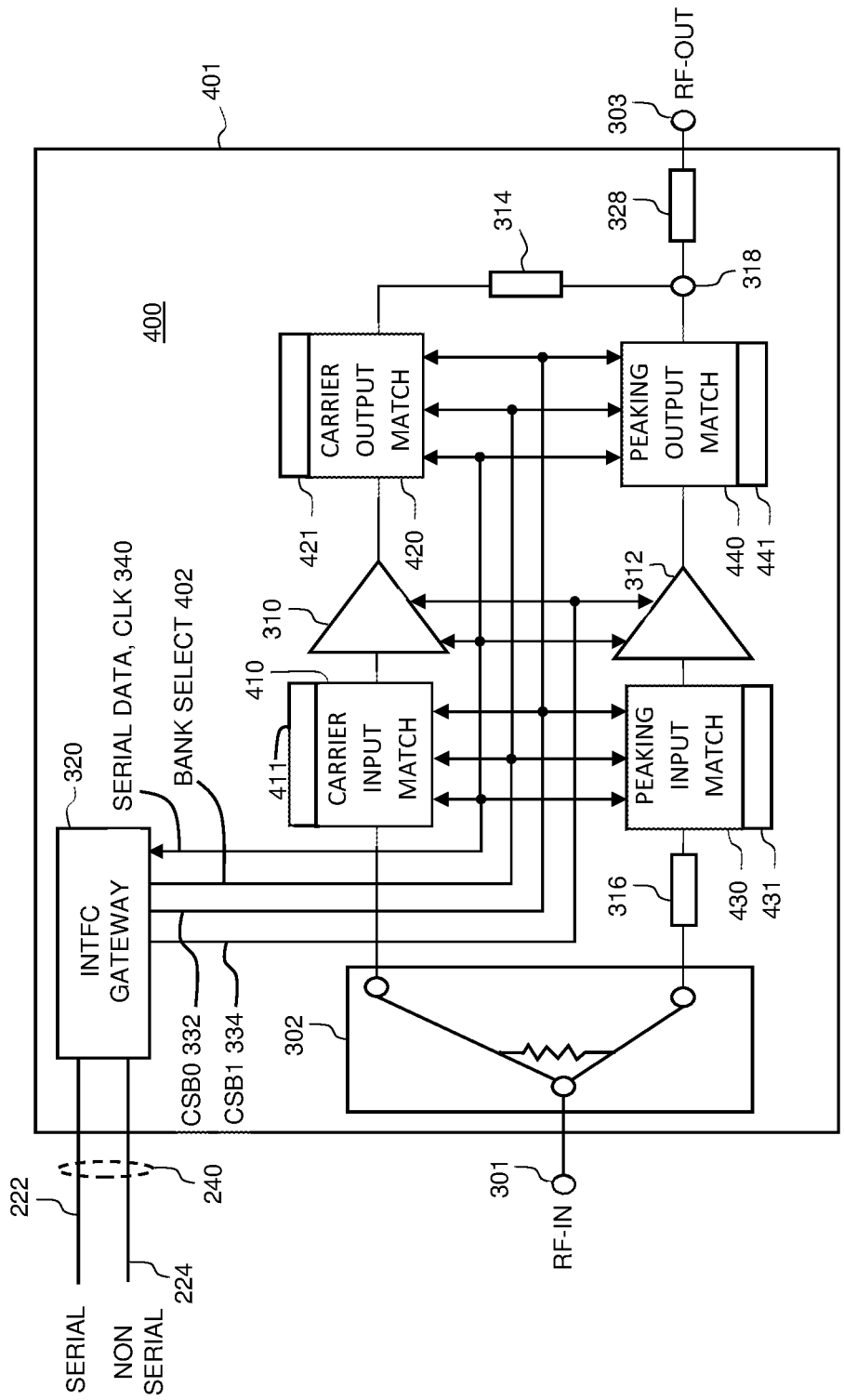

FIG. 5 shows a block diagram of a power amplifier module including a Doherty power amplifier with groups of digitally controllable elements, in accordance with an example embodiment. Power amplifier module 400 receives signals from a digital control interface 240 at interface gateway device 320. In embodiments represented by FIG. 5, external serial data interfaces 222 are converted into an internal serial data interface represented by common serial data and clock 340, and chip selects CSB 0 332 and CSB 1 334. Further, in embodiments represented by FIG. 5, interface gateway device 320 passes non-serial data interface 224 through as bank select signal 402. In the example of FIG. 5, digitally controllable element 411 represents a controllable element within an impedance matching circuit 410 at the input to carrier amplifier 310 ("carrier input match"), digitally controllable element 421 represents a controllable element within an impedance matching circuit 420 at the output of carrier amplifier 310 ("carrier output match"), digitally controllable element 431 represents a controllable element within an impedance matching circuit 430 at the input to peaking amplifier 312 ("peaking input match"), and digitally controllable element 441 represents a controllable element within an impedance matching circuit 440 at the output of peaking amplifier 312 ("peaking output match").

As an example, and not by way of limitation, one or more of impedance matching circuits 410, 420, 430, and 440 may include a T network with two inductors in series between the network input/output (e.g., between the splitter and the amp), and a shunt capacitor coupled to a node between the two inductors. In these embodiments, the digitally controllable elements may include a digitally variable shunt capacitor, and/or switches to control which inductors are included within the impedance matching circuit.

As shown in FIG. 5, digitally controllable elements 411, 421, 431, 441 within impedance matching circuits 410, 420, 430, and 440 are example embodiments of a group of digitally controllable elements (e.g., group 0 350; FIG. 4)). In this example, the entire group is coupled to the common serial data and clock 340 and chip select CSB 0 332.

In some embodiments, digitally controllable elements are included to influence the operation of different parts of Doherty amplifier 400. For example, in some embodiments, bias voltages of amplifiers 310, 312 may be modified using digitally controllable elements. For example, as shown in FIG. 5, amplifiers 310, 312 may be coupled to the common serial data and clock 340 and chip select CSB 1 354.

In some embodiments, Doherty amplifier 400 may support two (or more) tuneable states (e.g., corresponding to two different frequency bands) so that operational state of the amplifier may be quickly switched between the two tuning states using a single input pin (e.g., bank select 402). In this example, each of digitally controllable elements within group 0 (e.g., elements 411, 421, 431, 441) includes or accesses two bank registers which are used to set the tuning levels for each tuning state. The first tuning state may correspond to a first configuration for the four impedance matching circuits 410, 420, 430, 440, and the second tuning state may correspond to a second configuration for the four impedance matching circuits 410, 420, 430, 440. When the amplifier is operating in one tuning state, which utilizes tuning information ("tuning values") within the first bank registers ("current bank registers"), the second bank registers for the other state can be modified by writing new values to them through the digital control interface. Once the amplifier changes to operation in the other tuning state, the newly modified tuning values will be applied. Alternatively, the current bank registers can be written to through the digital control interface, in which case the change will take effect immediately.

In some embodiments, all of the components illustrated in FIG. 5 may be mounted on a module substrate 401 (e.g., a printed circuit board "PCB"), which may then be mounted to a system PCB.

Figure 6:
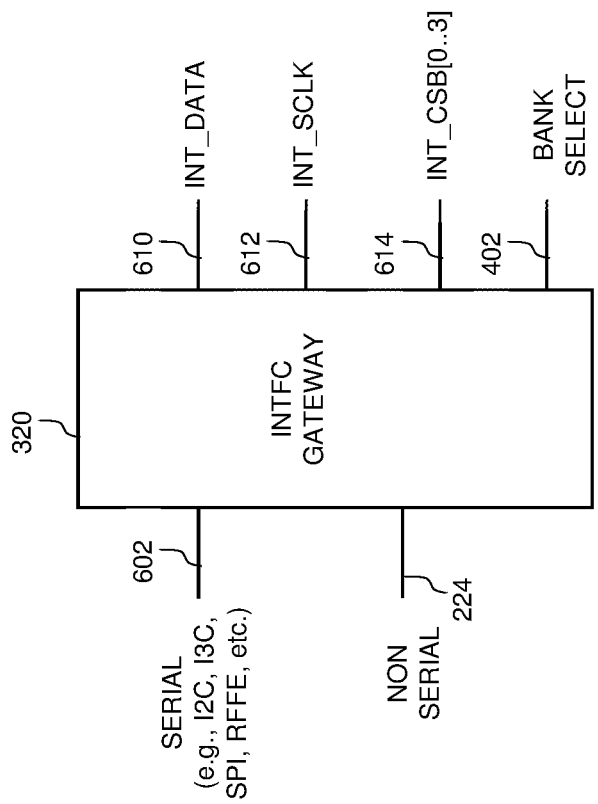
FIG. 6 shows a block diagram of a power amplifier module interface gateway device, in accordance with an example embodiment.

FIG. 6 shows a block diagram of a power amplifier module interface gateway device, in accordance with an example embodiment. Interface gateway device 320 is coupled to an external digital control interface (i.e., an interface that is electrically connected to and communicates with circuitry external to the power amplifier module), shown in FIG. 6 as serial data interface 602. and non-serial data interface 224.

Serial data interface 602 includes multiple signal lines that may be coupled to an external serial interface that adheres to one of many different serial protocols. For example, serial data interface 602 may be coupled to an external SPI serial data interface, an external I2C serial data interface, an external I3C serial data interface, an external RF front end (RFFE) serial data interface, or any other type of external serial data interface. Interface gateway device 320 is also coupled to an internal serial data interface (i.e., an interface that is electrically connected to and communicates with circuitry internal to the power amplifier module), shown in FIG. 6 as including INT_DATA 610, INT_SCLK 612, and chip select signals CSB[0 . . . 3] 614. The interface gateway device translates all the supported external interface protocols to a simpler SPI type format that is passed to the internal devices. The interface gateway device also converts data read from the internal devices back to the external protocol to send back to the host controller. Data packets are translated in real time without buffering, which makes the operation transparent to the external controller, and does not require any additional buffering logic.

In some embodiments, serial data interface 602 includes a Clock signal, a Data In/Out signal, a Data Out signal, and a Chip Select signal. These external signals may be coupled to either an I2C, I3C, or SPI serial interface as shown in Table 1, below.

TABLE 1

| External Signal | I2C | I3C | SPI |
|---|---|---|---|
| Clock | SCL | SCL | SCK |
| Data In/Out | SDA | SDA | SDI |
| Data Out | | | SDO |
| Chip Select | | | CSB |

In various embodiments, interface gate 320 is used to bridge SPI transactions from an external host controller (not shown) to internal client devices (e.g., DCE groups). Passing through the interface gateway device 320 adds additional delay to the SPI signals. When the host controller is writing to the client device this delay applies to both the SCLK and the SDI signal on the external SPI interface. Since both are delayed approximately equally the internal clock and data signals (INT_SCLK and INT_DATA) maintain their timing relationship and the transaction is performed successfully, just slightly delayed.

When the external host controller uses the SPI interface to read data back from the internal device the additional logic within interface gateway device 320 delays the returning INT_DATA signal, which may delay the signal so much that the serial data signal on the external SPI interface does not reach the controller until after the next SCLK rising edge and no longer matches the SPI protocol. In various embodiments, the INT_DATA signal from the internal client device starts half a clock cycle early by changing on the rising edge of SCLK instead of the falling edge. The SPI timing is reconstructed in the interface gateway device 320 where the INT_DATA signal passes through a latch before being passed to the SDO signal to the host controller.

Figure 7:
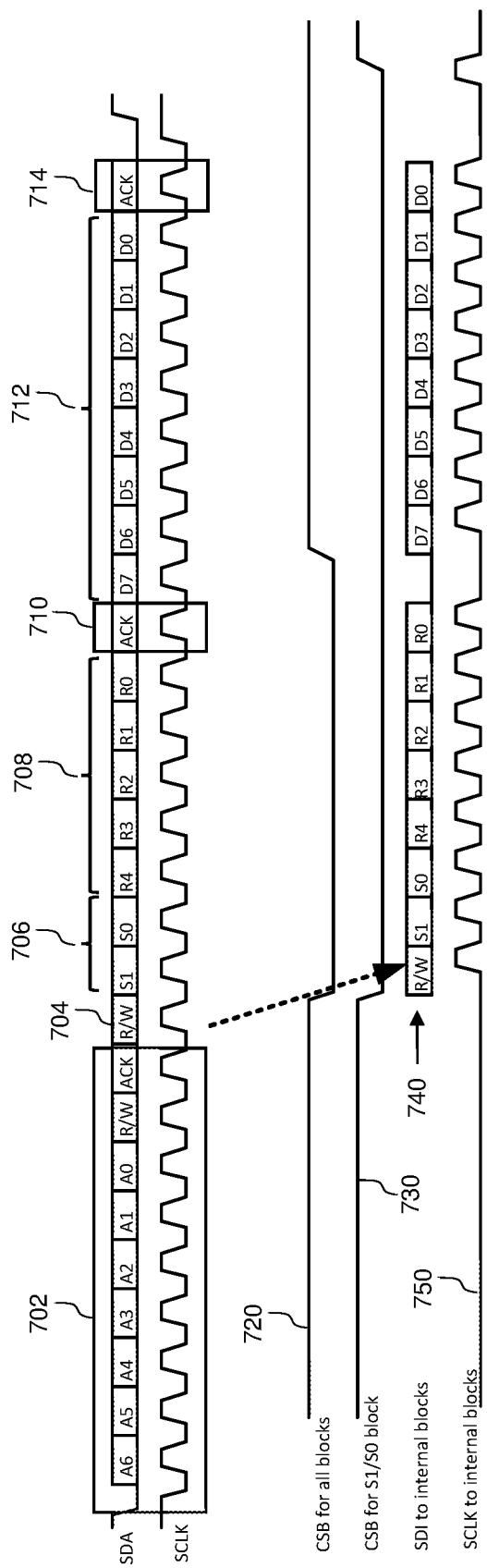
FIG. 7 shows a timing diagram for an example embodiment using an I2C or I3C interface to write data through an interface gateway device.

FIG. 7 shows a timing diagram for an example embodiment using an I2C or I3C interface to write data through an interface gateway device. In various embodiments, interface gateway device 320 is used to translate other protocol transactions from the external host controller to the internal client devices. In the example of FIG. 7, an external (e.g., I2C, I3C, RFFE, etc.) serial write transaction (i.e., a write transaction from an external source) is decoded and translated by the interface gateway device 320 to a SPI-like internal serial write transaction. In this case the interface gateway device 320 removes some of the clock pulses from the I2C, I3C or RFFE transaction and converts it into a SPI-like transaction. The additional clock cycles in the original transaction enable the interface gateway device logic to be pipelined if desired to avoid the tighter timing concerns of the SPI bridging mode.

The external serial data interface is represented in FIG. 7 by serial data SDA and serial clock CLK. The internal serial data interface is represented in FIG. 7 by CSB signals 720, 730, internal serial data SDI 740, and internal clock SCLK 750.

An external serial write transaction may begin at 702 when a first data unit of serial data (SDA) is presented on a serial data interface (e.g., serial interface 602, FIG. 6), where the first data unit includes a seven bit address A6-A0, a read/write (R/W) bit, and an acknowledgement (ACK) bit. In some embodiments, the address may specify an address corresponding to a PAM module, where each distinct PAM module has a unique address. For example, address bits A6-A0 may specify one of the PAM modules 242, 244, 246 shown in FIG. 3. Each PAM module includes an interface gateway device 320 that responds to a unique address, thereby allowing individual PAM modules to be addressed at 702.

As part of the serial protocol translation, the first data unit 702 of the external transaction is masked from (i.e., not conveyed to) the internal serial data interface for all PAMs, including the addressed PAM (i.e., the PAM identified by the address bits A6-A0 in data unit 702) and the non-addressed PAMs (i.e., all other PAMs). Within non-addressed PAMs, the remainder of the transaction is also masked from the internal serial data interface. The transaction shown in FIG. 7 represents communication within an addressed PAM (e.g., a PAM that responds to the address specified at 702).

When the PAM is being addressed, the interface gateway device 320 passes the next serial byte including the R/W bit 704, group bits S0, S1, 706, and register address bits 708 through to the internal serial data interface 610 at 740. The interface gateway device also asserts all chip select signals 614 at 720 within the addressed PAM for the next serial byte to allow each group of digitally controllable elements coupled to the addressed PAM (i.e., the "addressed group") to decode the R/W bit 704, the addressed group specified by group bits S1, S0 706, and the register address bits 708. The R/W bit 704 specifies whether the transaction is a read or a write transaction, the group bits 706 specify which group of DCEs is being addressed, and the register address bits 708 specify which register(s) within the addressed group are being addressed. As an example, referring back to FIG. 5, power amplifier module 400 includes two groups. Group 0 includes elements 411, 421, 431, 441, and group 1 includes elements within amplifiers 312 and 310. If, in the transaction of FIG. 7, the group bits 706 specify group 0, then a register in one of elements 411, 421, 431, and 441 will be addressed by register address bits 708. Similarly, if the group bits 706 specify group 1, then a register in one of the elements within amplifiers 310, 312 will be addressed by register address bits 708.

The interface gateway device 320 asserts the chip select for an addressed group at 730. For example, if group 0 is addressed by group bits 706, then CSB 0 will be asserted at 730. An acknowledge bit ACK 710 is masked from the internal serial data, and then one or more data bytes 712 are passed on to the internal serial data interface 610 at 740. A final ACK 714 is masked.

Figure 8:
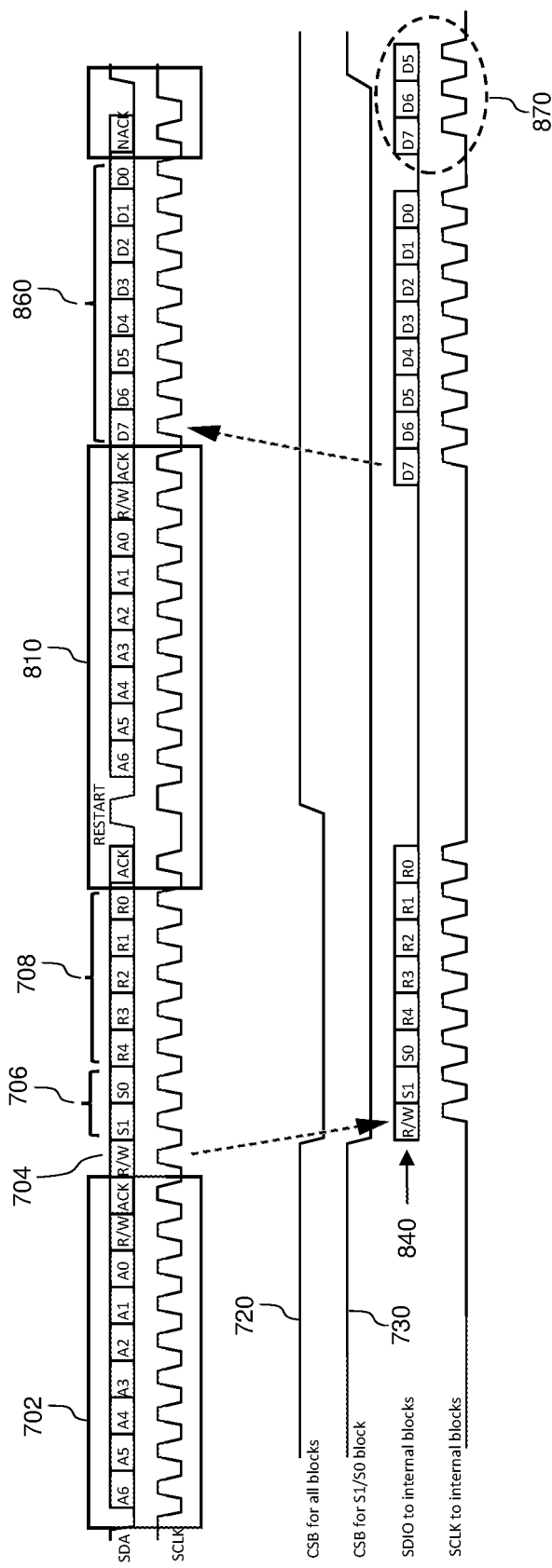
FIG. 8 shows a timing diagram for an example embodiment using an I2C or I3C interface to read data through an interface gateway device.

FIG. 8 shows a timing diagram for an example embodiment using an I2C or I3C interface to read data through an interface gateway device. An I2C or I3C read transaction operates in a similar manner to the write transaction described above with reference FIG. 7. The read operation illustrated in FIG. 8 begins similarly to the write operation in FIG. 7. The first data unit 702 including the PAM address, RAY bit, and ACK bit is received at the interface gateway device. When a PAM is being addressed, the chip selects 614 for all groups within the PAM are asserted at 720 for the next serial byte, and R/W bit 704, group bits 706, and register address bits 708 are passed through to the internal serial data interface 610 at 840. The interface gateway device then receives a restart and the PAM address and R/W bit again on the external serial data interface at 810. In response, the addressed digitally controllable element within the addressed group writes serial data on the internal serial data which is then passed on to the external serial data interface at 860. Extraneous data and clock pulses may be presented on the internal serial bus which may be ignored by the interface gateway device.

FIG. 9A shows a block diagram of a digitally controllable element, in accordance with an example embodiment. Digitally controllable element 900 may be used to implement any of the digitally controllable elements described herein. For example, in some embodiments, digitally controllable element 900 may be used to implement any of elements within groups 350, 352, 354, or 356 (FIG. 4) or elements 411, 421, 431, or 441 (FIG. 5).

Digitally controllable element 900 includes serial interface circuit 910, control register 912, test register 914, bank 1 register 916, bank 2 register 918, and multiplexers 940 and 942. In some embodiments, digitally controllable element 900 also includes one or more digital variable capacitors and/or or passive circuits with switching elements (e.g., transistors) that switch in/out circuit elements (e.g., the switching elements controlled by multiplexers 940 and 942). Serial interface circuit 910 is coupled to a serial data interface represented in FIG. 9 as DATA/CTL IN on node 902 and DATA OUT on node 904. The serial data interface may take any form. For example, in some embodiments, the serial data interface may be a three-wire serial data interface and in other embodiments, the serial data interface may be a four-wire serial data interface. In general, the various embodiments are not limited by the type of serial data interface employed.

In the example of FIG. 9A, digitally controllable element 900 supports two tuneable states of a tuneable element (e.g., a variable component or configurable circuit) in an amplifier. For example, bank 1 register 916 may store a first digital word that specifies a first tuneable state, and bank 2 register 918 may store a second digital word that specifies a second tuneable state. Each of the first and second digital words may encode, for example, a tuneable element value (or control values corresponding to a tuneable element value) and/or a switch state indicator. The bank select signal on node 402 may cause multiplexers 940, 942 to configure the tuneable element into either of two tuneable states by passing the contents of either bank 1 register 916 or bank 2 register 918 to the outputs of the multiplexers 940, 942. In some embodiments, the output of multiplexer 940 controls one or more digitally variable capacitors, and the output of multiplexer 942 controls one or more switches that are coupled to add or remove circuit elements from an amplifier circuit. For example, one or more capacitors, inductors or resistors may be coupled to, or decoupled from, a tuning circuit based on the output of multiplexer 942. Control register 912 and test register 914 may be used for any purpose, and in some embodiments, they are omitted.

FIG. 9B shows an address map of the registers 912, 914, 916, 918 within digitally controllable element 900 of FIG. 9A, in accordance with an example embodiment. For example, data that is presented sequentially by gateway 320 on the internal serial data interface 610 is communicated to a serial data interface (e.g., DATA/CTL IN node 902) of the digitally controllable element 900. This data may be written by element 900 sequentially to the registers 916, 918 within the digitally controllable element 900. Similarly, during a read operation, the digitally controllable element 900 may present the contents of the registers 912, 914, 916, 918 sequentially on a serial data interface (e.g., DATA OUT node 904) in response to a read command.

FIG. 9C shows a timing diagram of a write operation to the digitally controllable element 900 of FIG. 9A, in accordance with an example embodiment. FIG. 9C shows a chip select signal CSB, a serial clock signal SCLK, and a serial data input signal SDI, all of which are parts of DATA/CTL IN 902 (the internal serial data interface). The first byte 960 represents the RAY bit 704, the group bits 706, and the register address bits 708 (FIG. 7). In operation, when the CSB signal is asserted (low), the serial interface 910 will decode the first byte 960 (or any word size) of serial data as an address. In some embodiments, the first byte 960 also specifies a command. For example, the first byte 960 may specify a read or a write command in addition to an address corresponding to a digitally addressable element. When the first byte 960 includes an address that matches the address assigned to a register 912, 914, 916, 918 within element 900, serial interface 910 performs an action. For example, when a write command is decoded from the first byte 960, and the first byte 960 also indicates an address that maps to one of the registers 912, 914, 916, 918, serial interface 910 receives additional serial data (e.g., bytes 961, 962, 963, 964) presented sequentially on the serial data interface (DATA/CTL IN node 902) and writes to the internal registers 912, 914, 916, 918, starting at the address encoded in the first byte 960. In the example of FIGS. 9B and 9C, for example, assuming that the first byte 960 indicates address 0, Data 1 961 is written to address 0 (control register 912), Data 2 962 is written to address 1 (bank 1 register 916), Data 3 963 is written to address 2 (bank 2 register 918), and Data 4 964 is written to address 3 (test register 914). The gateway 320 may than indicate a tuneable state through the bank select signal on node 402.

In some embodiments, serial interface 910 includes additional decoding circuitry to enable interleaving the register address map shown in FIG. 9B with the register address maps of other digitally controllable devices (e.g., additional instances of device 900). For example, when multiple digitally controllable elements are included in an amplifier module and coupled in parallel to the serial data interface, data presented sequentially may be written to registers in multiple digitally controllable elements. These and other embodiments are further described below.

Figure 10B:
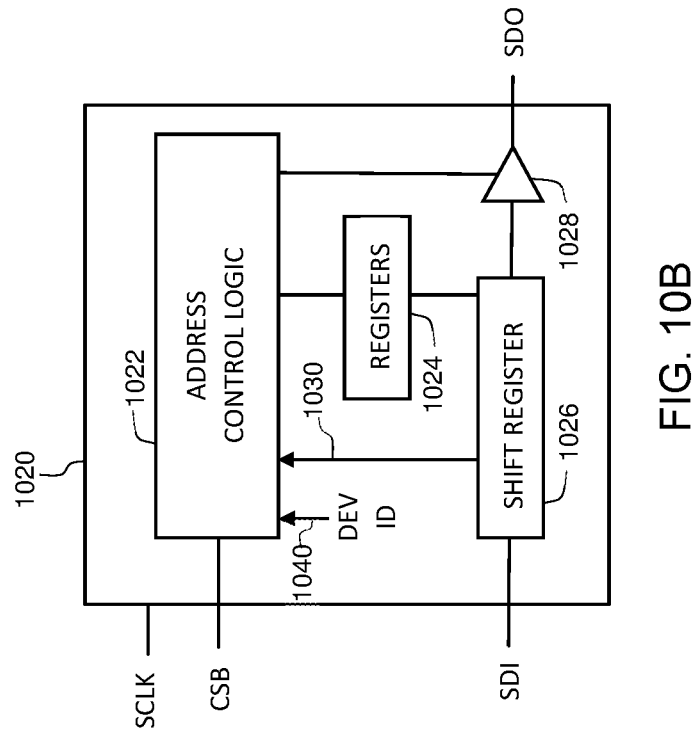
FIG. 10B shows a block diagram of a digitally controllable element, in accordance with an example embodiment.
Figure 10A:
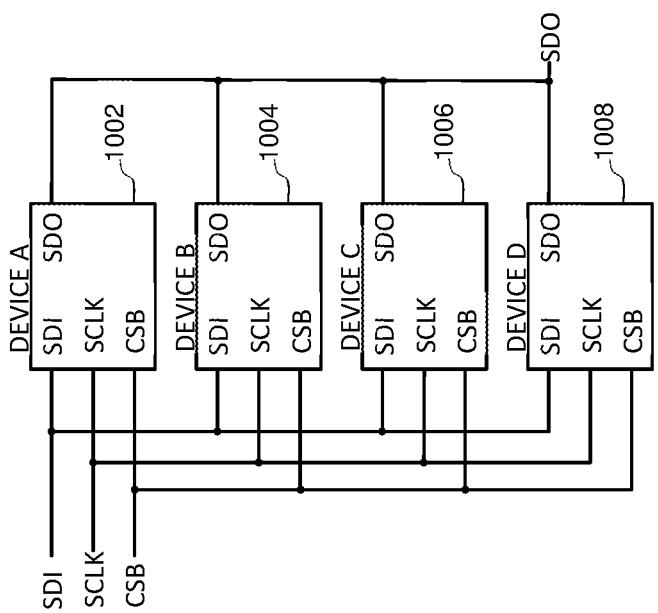
FIG. 10A shows a block diagram of multiple interconnected digitally controllable elements, in accordance with an example embodiment.

FIG. 10A shows a block diagram of multiple interconnected digitally controllable elements, in accordance with an example embodiment. In the example of FIG. 10A, digitally controllable elements 1002, 1004, 1006, 1008 (e.g., four instances of digitally controllable element 900) are coupled in parallel to a serial data interface that includes signals SDI, SDO, CSB, and SCLK. In some embodiments, the four digitally controllable elements of FIG. 10A may correspond to four digitally controllable elements in a power amplifier module. For example, element 1002 may correspond to element 411 (FIG. 5), element 1004 may correspond to element 421 (FIG. 5), element 1006 may correspond to element 431 (FIG. 5), and element 1008 may correspond to element 441 (FIG. 5). Each element 1002, 1004, 1006, 1008 may include a same type of tuneable element (e.g., a tuneable capacitor or configurable circuit), or elements 1002, 1004, 1006, 1008 may include different types of tuneable elements.

FIG. 10B shows a block diagram of a digitally controllable element, in accordance with an example embodiment. Digitally controllable element 1020 may implement any of the digitally controllable elements described herein, including elements 411, 421, 431, 441 (FIG. 5), 900 (FIG. 9A), and 1002, 1004, 1006, 1008 (FIG. 10A). Element 1020 includes address control logic 1022, registers 1024, shift register 1026, and output buffer 1028. Element 1020 may also include variable circuit elements (e.g., digitally variable capacitors) and passive circuits such as switches as described above.

In operation, serial data present on a serial data in (SDI) line is received at (i.e., clocked into) shift register 1026 during a write operation, and data from registers 1024 is presented as serial data on serial data out (SDO) via shift register 1026 during a read operation. Address control logic 1022 receives the chip select signal CSB and decodes the address and operation (e.g., read or write) from the first byte (e.g., byte 960, FIG. 9C) received from the shift register through connection 1030. Address control logic 1022 also receives a device identifier (DEV ID) at input 1040. During a write operation, and in response to the address and the DEV ID, address control logic 1022 may or may not write to registers 1024 in accordance with an interleaved register accessing sequence wherein the physical registers 1024 in the various elements (e.g., 1002, 1004, 1006, 1008) are interleaved in a logical register writing sequence. This is illustrated in FIG. 11A where the bank 1 registers from different digitally controllable elements are logically grouped together, the bank 2 registers are grouped together, the control registers are grouped together, and the test registers are grouped together. FIG. 11A is described in more detail below.

In the example of FIG. 10B, the DEV ID is hard coded within digitally controllable element 1020, and each of the digitally controllable elements 1002, 1004, 1006, 1008 has a different DEV ID value. In these embodiments, each of the digitally controllable elements 1002, 1004, 1006, 1008 (e.g., elements included within an amplifier module) includes a mechanism to store or otherwise specify the DEV ID. In some embodiments, each of the digitally controllable elements may include a slightly different semiconductor device (e.g., silicon) design to accommodate different DEV IDs.

In various embodiments, the address control logic 1022 may include one or more state machines and digital logic to perform the operations described herein. For example, address control logic 1022 may include a counter that is loaded with the address value clocked in through the shift register 1026, and the counter may be incremented each SCLK cycle. A decoder circuit may then decode the counter state along with the DEV ID to determine which (if any) registers within the current digitally controllable element are being addressed (e.g., written to or read from). This address decoding logic enables each digitally controllable element 1002, 1004, 1006, 1008 to keep track of which register is being accessed during each clock cycle of the serial transaction. The read/write action of each transaction cycle is gated by the address decoding logic so that although the action is sent to all of the digitally controllable elements 1002, 1004, 1006, 1008 coupled in parallel to the serial data interface, only the element or elements that use that particular register address perform the action. The use of the DEV ID allows the same address decoding logic to be used in all of the digitally controllable elements 1002, 1004, 1006, 1008.

FIG. 11A shows an address map of the multiple interconnected digitally controllable elements 1002, 1004, 1006, 1008 of FIG. 10A, in accordance with an example embodiment. Register address map 1100 shows an example interleaved register address map presented by multiple digitally addressable elements that are coupled in parallel to a serial data interface, such as elements 1002, 1004, 1006, 1008 (FIG. 10A). As further explained below, address control logic within each element decodes an element specific device identifier and an address presented on the serial data interface to determine the configuration of the interleaved register address map. For convenience of description and illustration, a first digitally controllable element (e.g., element 1002) is designated as device "A," a second digitally controllable element (e.g., element 1004) is designated as device "B," a third digitally controllable element (e.g., element 1006) is designated as device "C," and a fourth digitally controllable element (e.g., element 1008) is designated as device "D." In the interleaved address map 1100, physical writeable registers of the same type or location (e.g., Control, Bank 1, Bank 2, and Test) in the multiple digitally controllable elements are logically grouped together in a writing sequence such that a serial writing order of each of the writeable registers in an element is interleaved with a serial writing order of writeable registers in other elements.

As an example, bank 1 registers from four different digitally controllable elements A, B, C, and D (A Bank 1, B Bank 1, C Bank 1, D Bank 1) are logically grouped in the register address map and are addressed in sequential order (e.g., as addresses 4-7), even though they correspond to physical registers in different devices. Similarly, bank 2 registers from four different digitally controllable elements A, B, C, and D (A Bank 2, B Bank 2, C Bank 2, D Bank 2) are logically grouped in the register address map and are addressed in sequential order (e.g., as addresses 8-11). Accordingly, the writing order of bank 1 registers from different digitally controllable elements are interleaved, and the writing order of bank 2 registers from different digitally controllable elements are interleaved, in order to create the interleaved register address map 1100. This allows a sequential, serial write operation to bank 1 registers in all of the digitally controllable registers without disturbing (e.g., overwriting) the contents of the other registers within the digitally controlled elements (e.g., bank 2, test, and control registers). Similarly, this allows a sequential, serial write operation to bank 2 registers in all of the digitally controllable registers without disturbing (e.g., overwriting) the contents of the other registers within the digitally controlled elements (e.g., bank 1, test, and control registers). An example write operation is illustrated in FIG. 11B.

FIG. 11B shows a timing diagram of a write operation to the multiple interconnected digitally controllable elements of FIG. 10A, in accordance with an example embodiment. The write operation 1140 illustrated in FIG. 11B demonstrates writing to bank 1 registers in elements 1002, 1004, 1006, 1008 (FIG. 10A) according to the interleaved register address map 1100 (FIG. 11A). A write operation to address 4 "write 4" is presented as the first byte 1160 on the serial data input SDI line of the serial data interface. This is received (at shift register 1026) and decoded (by address control logic 1022) by all four digitally controllable elements 1002, 1004, 1006, 1008. The address control logic within each element decodes the write 4 along with the element specific DEV ID, and the element that includes the register mapped in the register address map 1100 to address 4 (element 1002, DEVICE A) performs the first write. Accordingly, when presented as the second byte 1162 on the serial data input SDI line of the serial data interface, the serial data in byte 1162 is written to the bank 1 register of device A (element 1002). Then the address within each element is incremented by the address control logic (in this example to address "5"). The address control logic within each element then decodes the incremented address value of 5 along with the element specific DEV ID, and, according to the register address map 1100, the element that includes the register at address 5 (element 1004, DEVICE B) performs the next write into its bank 1 register. Accordingly, the serial data in byte 1164 is written to the bank 1 register of device B (element 1004). In a similar manner, the serial data in subsequently received byte 1166 is written to the bank 1 register of device C (element 1006), and the serial data in subsequently received byte 1168 is written to the bank 1 register of device D (element 1008).

As illustrated in FIGS. 11A and 11B, multiple digitally controllable elements coupled in parallel to a serial data interface are configured to present an interleaved register address map to the serial data interface in response to a unique device identifier assigned to each of the multiple digitally controllable elements. Although FIG. 11B illustrates a write operation to a single bank of interleaved registers, the various embodiments described herein are not limited in this respect. For example, in some embodiments, write operations span banks such that multiple banks are written in a single write operation. Also for example, in some embodiments, test and control registers are contiguous in the interleaved register address map, and single write operation may update the contents of all test and control registers in all digitally controllable elements without disturbing the contents of any of the bank 1 registers or bank 2 registers.

Read operations may be performed in a similar manner. For example, during a read operation, the write 4 in byte 1160 may instead be a "read 9" (or a read of another register address), and each digitally controllable register will decode the address along with the element's specific DEV ID to determine which register contents are to be presented on the SDO output, in this instance resulting in the bank 2 register contents being read from multiple digitally controllable elements in a sequence according to the interleaved register map shown at 1100 (FIG. 11A).

Figure 12B:
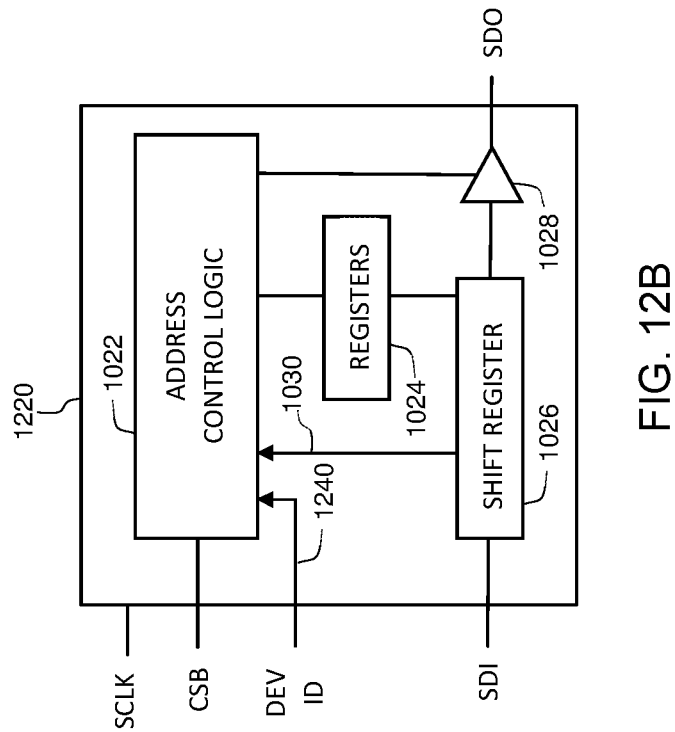
FIG. 12B shows a block diagram of a digitally controllable element, in accordance with an example embodiment.
Figure 12A:
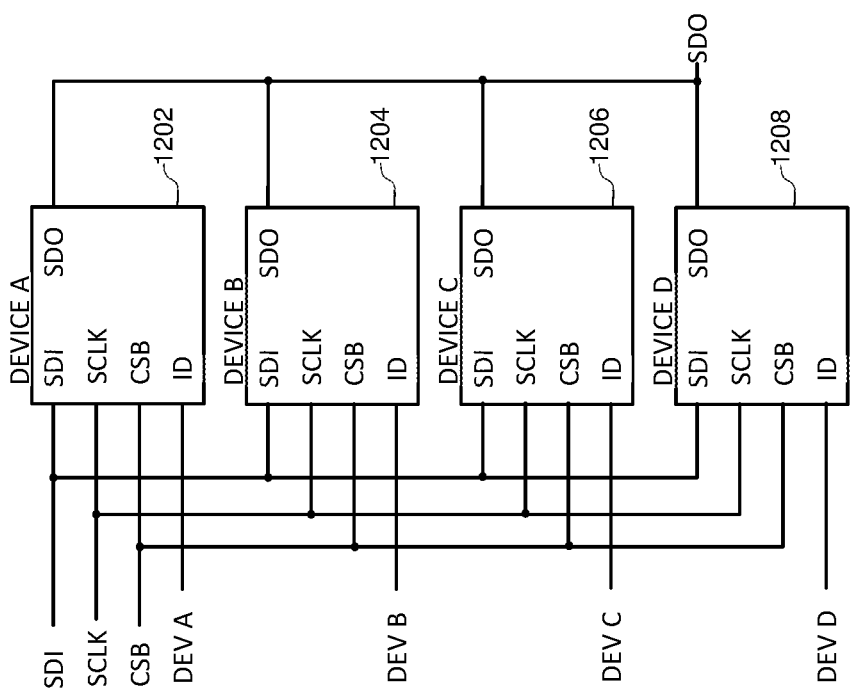
FIG. 12A shows a block diagram of multiple interconnected digitally controllable elements, in accordance with an example embodiment.

FIG. 12A shows a block diagram of multiple interconnected digitally controllable elements, in accordance with an example embodiment. In the example of FIG. 12A, digitally controllable elements 1202, 1204, 1206, 1208 (e.g., four instances of digitally controllable element 900) are coupled in parallel to a serial data interface that includes signals SDI, SDO, CSB, and SCLK. In some embodiments, the four digitally controllable elements of FIG. 12A may correspond to four digitally controllable elements in a power amplifier module. For example, element 1202 may correspond to element 411 (FIG. 5), element 1204 may correspond to element 421 (FIG. 5), element 1206 may correspond to element 431 (FIG. 5), and element 1208 may correspond to element 441 (FIG. 5). Each element 1202, 1204, 1206, 1208 may include a same type of tuneable element (e.g., a tuneable capacitor or configurable circuit), or elements 1202, 1204, 1206, 1208 may include different types of tuneable elements In embodiments represented by FIG. 12A, each of the digitally controllable elements also receives an element specific DEV ID. For example, element 1202 receives a DEV ID having a value of DEV A, element 1204 receives a DEV ID having a value of DEV B, element 1206 receives a DEV ID having a value of DEV C, and element 1208 receives a DEV ID having a value of DEV D. The element specific DEV ID values may be any values that the address control logic within the addressable elements can decode to determine the interleaved register address map. For example, the DEV A value may be zero, the DEV B value may be four, the DEV C value may be eight, and the DEV C value may be twelve.

FIG. 12B shows a block diagram of a digitally controllable element, in accordance with an example embodiment. Digitally controllable element 1220 may implement any of the digitally controllable elements described herein, including elements 411, 421, 431, 441 (FIG. 5), 900 (FIG. 9A), and 1002, 1004, 1006, 1008 (FIG. 10A). Element 1220 includes address control logic 1022, registers 1024, shift register 1026, and output buffer 1028, all of which are described above with reference to FIG. 10B. Element 1220 may also include variable circuit elements (e.g., digitally variable capacitors) and passive circuits such as switches as described above.

In the example of FIG. 12B, the DEV ID is not hard coded within digitally controllable element 1220. In these embodiments, each of the digitally controllable elements included within an amplifier module includes an additional DEV ID input, through which each element receives the element's specific DEV ID from an external node 1240. In these embodiments, each of the digitally controllable elements may be implemented using identical semiconductor device (e.g., silicon) designs, allowing any number of identical parts to be utilized within an amplifier module. In some embodiments, the element specific DEV IDs are specified by coupling multiple individual circuit traces within node 1240 to logic levels when a digitally controllable element is placed in an amplifier module. For example, in some embodiments, node 1240 may include four individual circuit traces, allowing for 16 different DEV ID values. DEV A may be set to zero (0001), DEV B may be set to four (0100), DEV C may be set to eight (1000), and DEV D may set to twelve (1100). As another example, in some embodiments, node 1240 may include only two individual circuit traces, allowing for 4 different DEV ID values. DEV A may be set to zero (00), DEV B may be set to one (01), DEV C may be set to two (10), and DEV D may set to three (11). These DEV ID values are presented as examples only, and the various embodiments are not limited in this respect.

Figure 13:
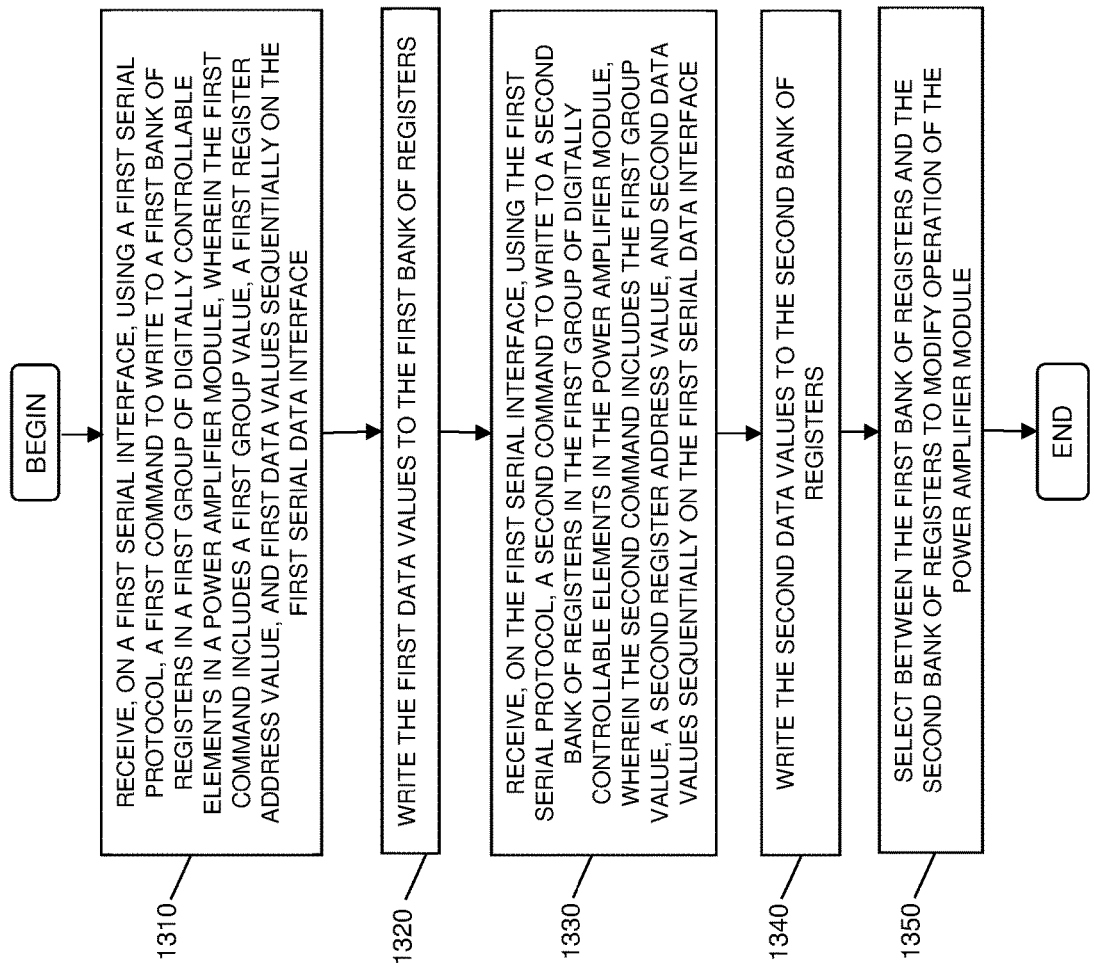
FIG. 13 is a flowchart illustrating methods, in accordance with various embodiments.

FIG. 13 is a flowchart illustrating methods, in accordance with various embodiments. In block 1310, an interface gateway device receives, on a first serial data interface (e.g., serial interface 602, FIG. 6), using a first serial protocol, a first command to write to a first bank of registers in a first group of digitally controllable elements, wherein the first command includes a first group value, a first register address value, and first data values (collectively referred to as "data values") sequentially on the first serial data interface. The first serial data interface may be one of many different types of serial data interfaces coupled to the interface gateway device and accessible outside a power amplifier module. For example, the first serial data interface may be any of the serial data interfaces described above. Further, the first serial protocol may be any of the serial protocols described above (e.g., SPI, I2C, I3C, RFFE, etc.). An example of the operations of block 1310 is illustrated in FIG. 7 in which a first command (including bits 702, 704, 706, 708) is received including group value (e.g., group bits 706), a register address value (e.g., address bits 708), and sequential data values (e.g., data bits 712).

In block 1320, the first data values are written by the interface gateway device 320 to the first bank of registers (e.g., corresponding to addresses 4-7, FIG. 11A). The interface gateway device performs the write operation by translating the first serial protocol on the external serial data interface (e.g., serial interface 602, FIG. 6) to a second serial protocol on an internal serial data interface (e.g., interface 610, FIG. 6) coupled to the groups of digitally controllable elements. For example, as illustrated in FIG. 7, the interface gateway device produces chip select signals 720, 730, data 740, and clock 750 on the internal serial data interface to perform the write operation that was received in the first command on the external serial data interface at 1310.

In various embodiments, during the write operation at 1320, the first register address value and an element specific ID within each of the group-addressed digitally controllable elements (or provided from an external source) are decoded to write the multiple data values to registers in the multiple elements (or to read multiple data values from the registers, depending on whether the operation is write or read) according to an interleaved register address map. In one example of the operations of block 1320 (e.g., when the first register address specifies a write to register address 4, FIG. 11A), each of the digitally controllable elements may decode the write operation starting at register address 4 and write to the bank 1 registers at addresses 4, 5, 6, and 7 in interleaved register map 1100 in sequential order even though the physical registers corresponding to these addresses are physically located in different digitally addressable elements. In another example of the operations of block 1320, multiple banks of registers within the multiple elements may be written. For example, the first register address value may be followed by eight sequential data values, in which case both bank 1 registers and bank 2 registers will be written according to the interleaved register map 1100.

In block 1330, the interface gateway device receives, on the first serial data interface, using the first serial protocol, a second command to write to a second bank of registers in the first group of digitally controllable elements, wherein the second command includes the first group value, a second register address value, and second data values sequentially on the first serial data interface. As described above, the first serial data interface may be one of many different types of serial data interfaces coupled to the interface gateway device and accessible outside a power amplifier module. For example, the serial data interface may be any of the serial data interfaces described above (e.g., serial interface 602, FIG. 6), and the first serial protocol may be any of the serial protocols described above (e.g., SPI, I2C, I3C, RFFE, etc.). An example of the operations of block 1330 is illustrated in FIG. 7 in which a first command (including bits 702, 704, 706, 708) is received including group value (e.g., bits 706), a register address value (e.g., bits 708), and sequential data values (e.g., bits 712).

In block 1340, the second data values are written by the interface gateway device 320 to the second bank of registers (e.g., corresponding to addresses 8-11, FIG. 11A). The interface gateway device performs the write operation by translating the first serial protocol on the external serial data interface to the second serial protocol on the internal serial data interface coupled to the groups of digitally controllable elements. For example, as illustrated in FIG. 7, the interface gateway device produces chip select signals 720, 730, data 740, and clock 750 on the internal serial data interface to perform the write operation that was received in the first command on the external serial data interface at 1310.

In block 1350, a selection is made between multiple (e.g., first and second) logically contiguous banks of registers (e.g., bank 1 and bank 2) to influence or modify the operation of an amplifier module (e.g., to set the values of tunable elements or circuit configurations according to the values in the bank 1 registers or the bank 2 registers). The multiple logically contiguous banks of registers may be spread across multiple digitally controllable elements. In an example of the operations of block 1350, a bank select signal (e.g., bank select 402, FIG. 9A) may select one of bank 1 registers or bank 2 registers to select a tunable state of a power amplifier module (e.g., power amplifier module 265, FIG. 2). In some embodiments, the operations of blocks 1310 and 1320 are repeated to effect a write operation in one bank of registers while a different bank of registers is selected in block 1350. For example, a typical sequence may include 1) write both banks of registers in a single write operation (blocks 1310, 1320), 2) select bank 1 to put a power amplifier module in a first tunable state associated with bank 1 (block 1350), 3) while the power amplifier module is operating in the first tunable state, write to bank 2 (repeat blocks 1310, 1320) without disturbing bank 1 and without disturbing the amplifier operation in the first tunable state, and 4) subsequently selecting bank 2 to put the power amplifier module in a second tunable state (repeat block 1350). The aforementioned sequence is provided as an example only, and the various embodiments described herein support a myriad of different writing and selecting sequences.

In an alternate embodiment, the operations of blocks 1310 and 1320 may be repeated to effect a write operation in one bank of registers while that same bank of registers is selected in block 1350. For example, a typical sequence may include 1) write both banks of registers in a single write operation (blocks 1310, 1320), 2) select bank 1 to put an amplifier module in a first tunable state associated with bank 1 (block 1350), and 3) while the amplifier module is operating in the first tunable state, overwrite the registers of bank 1 (repeat blocks 1310, 1320).

The above-described embodiments relate to a system that is configurable into two states (e.g., an amplifier that is configurable to operate in two different frequency bands), where "Bank 1" pertains to settings associated with a first state, and "Bank 2" pertains to settings associated with a second state. In other embodiments, the system may be configurable into more than two states, and accordingly, additional registers associated with additional states may be interleaved and grouped together in the address map (e.g., Bank 3, Bank 4, and so on).

An embodiment of system includes an interface gateway device coupled to communicate with one or more host controllers using one or more first serial data interfaces using one or more first serial protocols, the interface gateway device configured to convert the one or more first serial protocols to a second serial protocol to communicate on a second serial data interface. The system further includes a first group of digitally controllable elements communicatively coupled in parallel to the interface gateway device, wherein each digitally controllable element of the first group of digitally controllable elements includes a plurality of writeable registers, and further includes an address control circuit. The address control circuit is configured to receive a first byte including an address value from the serial data interface, receive a plurality of data values from the serial data interface, and write at least one of the plurality of data values to at least one of the plurality of writeable registers in accordance with an interleaved register accessing sequence in which a serial writing order of the plurality of writeable registers is interleaved with a serial writing order of writeable registers in other digitally controllable elements of the plurality of digitally controllable elements.

According to a further embodiment of the system, the first group of digitally controllable elements are coupled to be responsive a common chip select signal within the serial data interface. According to a further embodiment, the address control circuit is configured to determine the interleaved register accessing sequence responsive to a unique device identifier assigned to each digitally controllable element of the plurality of digitally controllable elements. According to yet another further embodiment of the system, the unique device identifier is hard-coded within each digitally controllable element of the plurality of digitally controllable elements. According to yet another further embodiment of the system, each digitally controllable element of the plurality of digitally controllable elements includes an input node to receive the unique device identifier. According to a further embodiment, the address value specifies a write operation, and the address control circuit is configured to decode the write operation from the address value. According to another further embodiment, the address control circuit is further configured to receive a second address value from the serial data interface and present contents of at least one of the plurality of writeable registers on the serial data interface in accordance with the interleaved register accessing sequence. According to another further embodiment, the plurality of writeable registers within each digitally controllable element are organized into a plurality of banks, and wherein each digitally controllable element is responsive to a bank select signal to select one of the plurality of banks. According to a further embodiment, contents of a selected bank of the plurality of writeable registers are coupled to control at least one digitally variable capacitor. According to a further embodiment, contents of a selected bank of the plurality of writeable registers are coupled to control at least one variable impedance circuit within an amplifier module.

According to another further embodiment the amplifier module includes a Doherty power amplifier with a carrier amplifier path and a peaking amplifier path, the Doherty power amplifier includes a power splitter configured to divide the RF input signal into a carrier RF signal and a peaking RF signal, the digitally controllable elements include one or more variable capacitors and/or switches coupled to inductors coupled to either or both of the carrier amplifier path and the peaking amplifier path, and the digitally controllable elements are configured to modify operation of the amplifier by modifying impedances within the amplifier module.

An embodiment of a power amplifier module includes an RF input node, an RF output node, a plurality of first serial data interfaces accessible outside the power amplifier module, an interface gateway device coupled to the plurality of first serial data interfaces, and to provide a second serial data interface internal to the power amplifier module, at least one amplifier to amplify an input signal on the RF input node and produce an output signal on the RF output node, and a first group of digitally controllable elements coupled to modify operation of the at least one amplifier, the plurality of digitally controllable elements being coupled in parallel to the second serial data interface, wherein the first group of digitally controllable elements are configured to present an interleaved register address map to the second serial data interface in response to a unique device identifier assigned to each of the plurality of digitally controllable elements.

According to a further embodiment of the system, the at least one amplifier includes a Doherty power amplifier with a carrier amplifier path and a peaking amplifier path, and the plurality of digitally controllable elements include one or more variable impedance circuits coupled to either or both of the carrier amplifier path and the peaking amplifier path. According to a further embodiment, each of the plurality of digitally controllable elements includes physical registers, and the interleaved register address map includes a plurality of logically contiguous banks of registers, wherein each logically contiguous bank of registers of the plurality of logically contiguous banks of registers includes physical registers in each of the plurality of digitally controllable elements. According to yet another further embodiment of the system, the amplifier module includes a bank select input node coupled to select one of the logically contiguous banks of registers to modify operation of the at least one amplifier. According to yet another further embodiment of the system, the plurality of digitally controllable elements include programmable impedance circuits.

An embodiment of a method performed by a communication system includes receiving, on first serial data interface, using a first serial protocol, a first command to write to a first bank of registers in a first group of digitally controllable elements in a power amplifier module, wherein the first command includes a first group value, a first address value, and first data values sequentially on the first serial data interface; writing the first data values to the first bank of registers; receiving, on the first serial data interface, using the first serial protocol, a second command to write to a second bank of registers in a first group of digitally controllable elements in a power amplifier module, wherein the first command includes the first group value, a second address value, and second data values sequentially on the first serial data interface; writing the second data values to the second bank of registers; and selecting between the first bank of registers and the second bank of registers to modify operation of the power amplifier module.

According to a further embodiment, the method may further include writing to the first bank of registers when the second bank of registers are selected. The method may further include amplifying the RF input signal, by a power amplifier that includes a sub-circuit that is controllable based on the control signal produced by the control circuit. The method may further include writing to the second bank of registers when the first bank of registers are selected. According to another further embodiment of the method, selecting between the first bank of registers and the second bank of registers to modify operation of the power amplifier module includes selecting between two states of impedance matching circuits.

The preceding detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system comprising:
   an interface gateway device coupled to communicate with one or more host controllers using one or more first serial data interfaces using one or more first serial protocols, the interface gateway device configured to convert first data formatted using one of the one or more first serial protocols to second data formatted using a second serial protocol to communicate on a second serial data interface;
   a first group of digitally controllable elements communicatively coupled to the interface gateway device via the second serial data interface, wherein each digitally controllable element of the first group of digitally controllable elements includes a plurality of writeable registers, and further includes an address control circuit configured to
   receive a first address value from the second serial data interface;
   receive a plurality of data values from the second serial data interface; and
   write at least one of the plurality of data values to at least one of the plurality of writeable registers.

2. The system of claim 1, wherein the second serial data interface includes a first common chip select signal, and the first group of digitally controllable elements are coupled to the first common chip select signal of the second serial data interface.

3. The system of claim 2, further comprising a second group of digitally controllable elements communicatively coupled to the interface gateway device via the second serial data interface, wherein the second serial data interface also includes a second common chip select signal, and the second group of digitally controllable elements are coupled to the second common chip select signal of the second serial data interface.

4. The system of claim 1, wherein the address control circuit is configured to determine an interleaved register accessing sequence responsive to a unique device identifier assigned to each digitally controllable element of the first group of digitally controllable elements.

5. The system of claim 4, wherein the unique device identifier is hard-coded within each digitally controllable element of the first group of digitally controllable elements.

6. The system of claim 4, wherein each digitally controllable element of the first group of digitally controllable elements includes an input node to receive the unique device identifier.

7. The system of claim 1, wherein the first address value specifies a write operation, a group identifier, and a register address.

8. The system of claim 1 wherein the plurality of writeable registers within a first digitally controllable element of the first group of digitally controllable elements is organized into a plurality of banks, wherein the plurality of banks includes a first bank register and a second bank register, and wherein the first digitally controllable element is responsive to a bank select signal to select one of the first bank register or the second bank register of the plurality of banks.

9. The system of claim 8 wherein:
the first digitally controllable element includes the plurality of banks and a digitally variable capacitor;
the first bank register is configured to store a first value;
the second bank register is configured to store a second value; and
based on the bank select signal, the system is configured to control the digitally variable capacitor into either a first tuneable state corresponding to the first value in the first bank register or into a second tuneable state corresponding to the second value in the second bank register.

10. The system of claim 8 wherein:
the first digitally controllable element includes the plurality of banks and a switch;
the first bank register is configured to store a first value;
the second bank register is configured to store a second value; and
based on the bank select signal, the system is configured to control the switch into either a first switch state corresponding to the first value in the first bank register or into a second switch state corresponding to the second value in the second bank register.

11. The system of claim 8 wherein:
the system further includes an amplifier with an impedance matching circuit;
the impedance matching circuit includes the first digitally controllable element;
the first digitally controllable element includes the plurality of banks and a variable component selected from a variable capacitor and a switchable inductor circuit;
the first bank register is configured to store a first value;
the second bank register is configured to store a second value; and
based on the bank select signal, the system is configured to control the variable component into either a first tuneable state corresponding to the first value in the first bank register or into a second tuneable state corresponding to the second value in the second bank register.

12. A power amplifier module comprising:
a radio frequency (RF) input node;
a RF output node;
a plurality of first serial data interfaces accessible outside the power amplifier module;
an interface gateway device coupled to the plurality of first serial data interfaces, and configured to provide a second serial data interface internal to the power amplifier module;
an amplifier path coupled between the RF input node and the RF output node, wherein the amplifier path includes a power amplifier that is configured to amplify an input signal on the RF input node and produce an amplified output signal on the RF output node, and
wherein the amplifier path also includes a first group of digitally controllable element coupled to the power amplifier and to the second serial data interface, and wherein, based on signals received over the second serial data interface, the first digitally controllable element is configured to modify operation of the amplifier path.

13. The power amplifier module of claim 12, wherein:
the amplifier path is selected from a carrier amplifier path or a peaking amplifier path of a Doherty power amplifier with a carrier amplifier;
the amplifier path also includes a variable impedance circuit coupled to the power amplifier; and
the first digitally controllable element comprises a variable component of the variable impedance circuit.

14. The power amplifier module of claim 13, wherein:
the first digitally controllable element also includes a first bank register, a second bank register, and a bank select input node;
the bank select input node is coupled to the second serial data interface;
the first bank register is configured to store a first value;
the second bank register is configured to store a second value;
the bank select input node is configured to receive the bank select signal; and
based on the bank select signal, the first digitally controllable element is configured to select one of the first or second values from the first or second bank registers in order to modify a state of the variable component, and thus to modify operation of the power amplifier.

15. The power amplifier module of claim 12, wherein the first digitally controllable element is configured to present an interleaved register address map to the second serial data interface in response to a unique device identifier assigned to the first digitally controllable element, wherein the first digitally controllable element includes physical registers, and the interleaved register address map includes a logically contiguous bank of registers, and wherein the logically contiguous bank of registers comprises physical registers in the first digitally controllable element.

16. The power amplifier module of claim 12, wherein:
the amplifier path includes a variable impedance circuit coupled to the power amplifier; and
the first digitally controllable element comprises one or more components of the variable impedance circuit.

17. A method performed by an electronic system, the method comprising:
receiving, on first serial data interface, using a first serial protocol, a first command to write to a first bank of registers in a first group of digitally controllable elements in a power amplifier module, wherein the first command includes a first group value, a first register address value, and first data values sequentially on the first serial data interface;
converting the first command to a first internal command formatted using a second serial protocol to communicate on a second serial data interface to write the first data values to the first bank of registers;
receiving, on the first serial data interface, using the first serial protocol, a second command to write to a second bank of registers in the first group of digitally controllable elements in the power amplifier module, wherein the first command includes the first group value, a second register address value, and second data values sequentially on the first serial data interface;
converting the second command to a second internal command formatted using the second serial protocol to communicate on the second serial data interface to write the second data values to the second bank of registers; and selecting between the first bank of registers and the second bank of registers to modify operation of the power amplifier module.

18. The method of claim 17, wherein the selecting comprises selecting between two states of an impedance matching circuit.

19. The method of claim 17, further comprising writing to the first bank of registers when the second bank of registers are selected.

20. The method of claim 19, further comprising writing to the second bank of registers when the first bank of registers are selected.

* * * * *